(12) United States Patent
Tang et al.

(10) Patent No.: US 12,495,127 B2
(45) Date of Patent: Dec. 9, 2025

(54) SYSTEM AND METHOD FOR TRACKING A REGION OF INTEREST

(71) Applicant: Syber Sense IP Holdings, LLC, Millcreek, UT (US)

(72) Inventors: Lap Tak Tang, Hong Kong (CN); Barrett Morgan, Millcreek, UT (US)

(73) Assignee: SYBER SENSE IP HOLDINGS, LLC, MIllcreek, UT (US)

( * ) Notice: Subject to any disclaimer, the term of this patent is extended or adjusted under 35 U.S.C. 154(b) by 24 days.

(21) Appl. No.: 18/082,355

(22) Filed: Dec. 15, 2022

(65) Prior Publication Data

US 2023/0188682 A1     Jun. 15, 2023

Related U.S. Application Data

(60) Provisional application No. 63/289,893, filed on Dec. 15, 2021.

(51) Int. Cl.
| | |
|---|---|
| *H04N 7/18* | (2006.01) |
| *G06V 10/25* | (2022.01) |
| *G06V 20/40* | (2022.01) |
| *G06V 20/52* | (2022.01) |
| *G06V 40/20* | (2022.01) |
| *H04N 5/272* | (2006.01) |
| *H04N 23/67* | (2023.01) |

(52) U.S. Cl.
CPC ............ *H04N 7/183* (2013.01); *G06V 10/25* (2022.01); *G06V 20/41* (2022.01); *G06V 20/52* (2022.01); *G06V 40/20* (2022.01); *H04N 5/272* (2013.01); *H04N 7/188* (2013.01); *H04N 23/675* (2023.01)

(58) Field of Classification Search
CPC ........ G06V 10/25; G06V 20/52; G06V 20/41; G06V 40/20; H04N 23/675; H04N 5/272; H04N 7/188
USPC ......................................................... 348/162
See application file for complete search history.

(56) References Cited

U.S. PATENT DOCUMENTS

| | | | |
|---|---|---|---|
| 10,713,928 B1* | 7/2020 | Gerstberger | G08B 13/19645 |
| 2008/0129844 A1* | 6/2008 | Cusack | H04N 23/80 |
| | | | 348/241 |
| 2018/0247504 A1* | 8/2018 | Siminoff | G06V 20/52 |
| 2018/0359451 A1* | 12/2018 | Siminoff | H04N 23/661 |
| 2019/0215475 A1* | 7/2019 | Herz | G06T 1/0007 |

* cited by examiner

*Primary Examiner* — Stuart D Bennett
(74) *Attorney, Agent, or Firm* — Kilpatrick Townsend & Stockton LLP

(57) ABSTRACT

A home security device may include one or more sensors and a camera for capturing image data. The home security device may also include processors and a non-transitory computer-readable memory. The home security device may perform operations including detecting a trigger by the camera and/or the sensors and receiving image data representing a field of view. The field of view may include a suspected object of interest. The operations may include identifying a region of interest containing the suspected object of interest. The operations may include determining that the suspected object of interest is an object of interest based on output from an artificial intelligence model. The operations may also include providing a first video stream representing the field of view and second video stream representing the region of interest for presentation at the computing device substantially simultaneously.

18 Claims, 7 Drawing Sheets

SYSTEM AND METHOD FOR TRACKING A REGION OF INTEREST

CROSS-REFERENCES TO RELATED APPLICATION(S)

This application claims the benefit of U.S. Provisional Patent Application No. 63/289,893, filed Dec. 15, 2021, the entire contents of which are hereby incorporated by reference for all purposes in its entirety.

BACKGROUND

Home security camera systems often show a wide field of view. The events meant to be captured by the home security camera systems generally occur in only a portion of the field of view.

BRIEF SUMMARY

In a first example, a home security device may include one or more sensors and a camera configured to capture image data. The device may also include one or more processors and a non-transitory computer-readable memory, including instructions that when executed by the one or more processors, cause the home security device to perform operations. The operations may include detecting a trigger by the camera and/or the one or more sensors. The operations may further include receiving image data representing a field of view by the camera. The field of view may include a suspected object of interest. The operations may include identifying a region of interest within the field of view, where the region of interest includes the suspected object of interest. The operations may include determining that the suspected object of interest is an object of interest based on output from an artificial intelligence model. The output may be generated by the artificial intelligence model using a portion of the image data corresponding to the region of interest. The operations may also include providing, a first video stream representing the field of view for presentation at a computing device and providing, for presentation at the computing device substantially simultaneously with the first video stream, a second video stream representing the region of interest.

In a second example, a non-transitory computer-readable memory may include instructions that cause a computer to perform operations including detecting a triggering event utilizing one or more sensors. The operations may further include receiving image data representing a field of view by the camera. The field of view may include a suspected object of interest. The operations may include identifying a region of interest within the field of view, where the region of interest includes the suspected object of interest. The operations may include determining that the suspected object of interest is an object of interest based on output from an artificial intelligence model. The output may be generated by the artificial intelligence model using a portion of the image data corresponding to the region of interest. The operations may also include providing, a first video stream representing the field of view for presentation at a computing device and providing, for presentation at the computing device substantially simultaneously.

In a third example, a computer-implemented method may include receiving image data representing a field of view by the camera. The field of view may include a suspected object of interest. The method may include identifying a region of interest within the field of view, where the region of interest includes the suspected object of interest. The method may include determining that the suspected object of interest is an object of interest based on output from an artificial intelligence model. The output may be generated by the artificial intelligence model using a portion of the image data corresponding to the region of interest. The method may also include providing, a first video stream representing the field of view for presentation at a computing device and providing, for presentation at the computing device substantially simultaneously with the first video stream, a second video stream representing the region of interest.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
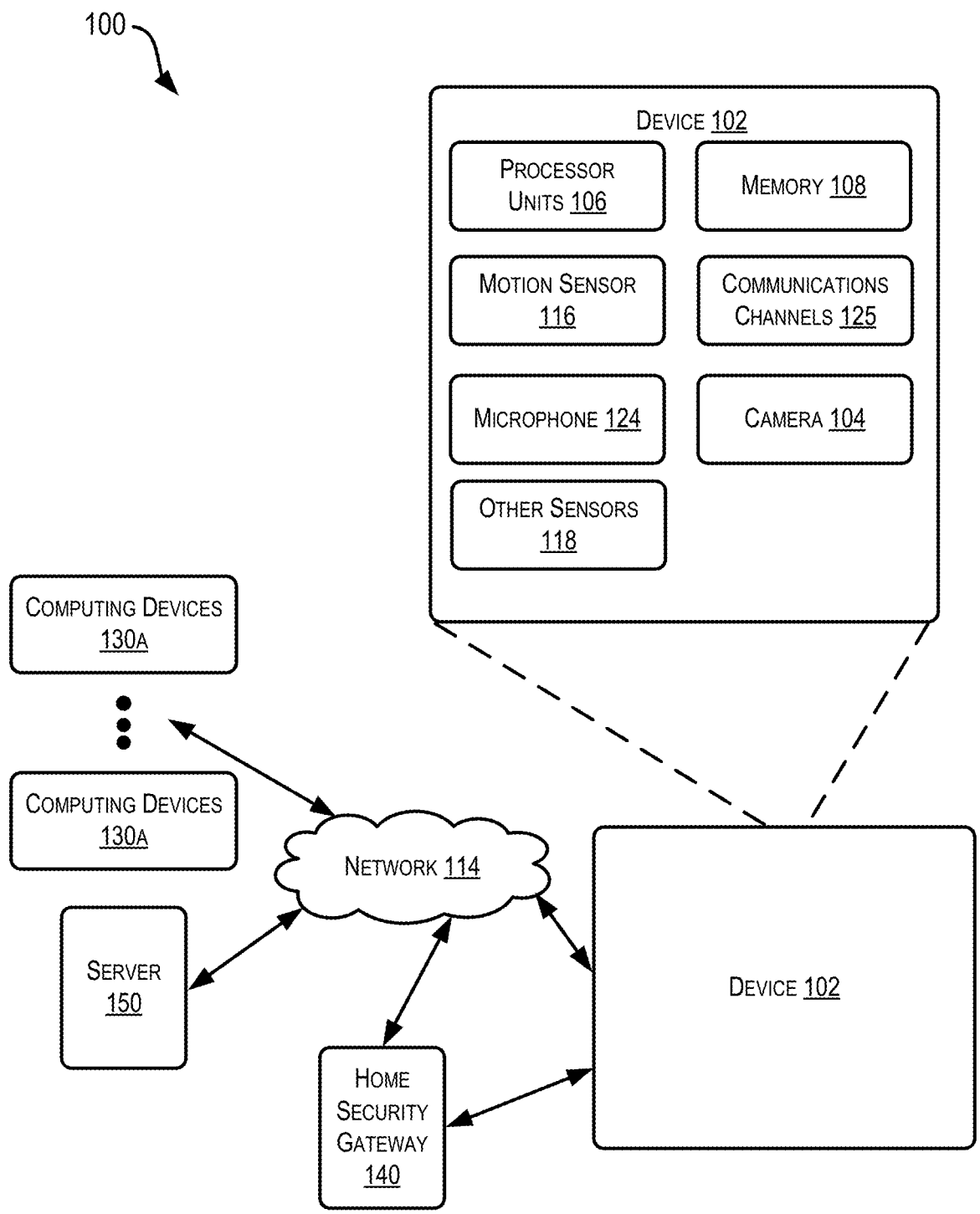
FIG. 1 illustrates a home security system, according to certain embodiments.

Home security systems often include one or more cameras. A camera has a field of view that captures a wide area in order to cover more area per camera, provide context for a scene within the field of view, and for other reasons. However, events of concern may only occur in a portion of the field of view. When such an event occurs, a user may desire to zoom in on, or focus, on the event and the objects involved. To do so, however, may require the user to monitor the field of view at the right time to observe the event. In home security systems with multiple cameras, multiple users may be required to monitor multiple fields of view. Furthermore, a user may miss something on a wider field of view, even if they are monitoring at the right time. For example, a person may walk into a small portion of the field of view. The person may be represented on only a small portion of a display and be easily missed. A system that automatically detects and displays a region of interest within a wider field of view may alleviate some or all of these problems.

Turning now to a specific example, a home security device may be configured to automatically detect objects of interest within a field of view. The home security device may include a variety of sensors, a camera, and computer components such as a processor, memory, and communication channels. The home security device may also utilize an artificial intelligence (AI) model to determine objects of interest and regions of interest. An unexpected object, motion within the field of view, or some other trigger may cause the home security device to receive image data corresponding to the camera's field of view. The image data may contain multiple objects. Using the AI model, some of the objects may be recognized as normal by the home security device. Other objects may not be recognized by the home security device and thus classified as suspected objects of interest. The home security device may the define a region of interest around the suspected object of interest. In other words, the region of interest can be automatically generated by the home security device in response to identifying a suspected object of interest.

The home security device may then determine that the suspected object of interest is an object of interest. The home security device may provide the image data including the portion of the field of view containing the region of interest to the AI model. The AI model may then compare the suspected object of interest to a reference library of objects and output a score that represents the likelihood the suspected object of interest is indeed an object of interest. If the score is above a certain threshold, the home security device may determine that the suspected object of interest is an object of interest.

The home security device may then provide a first video stream representing the field of view and a second video stream representing the region of interest and showing the object of interest. Images included in the first and second video stream may additionally or alternatively be enhanced by adjusting the light, the aperture, the white balance, and/or the brightness of the region of interest. Additionally, the images may be enhanced by magnifying and/or enlarging the region of interest. For example, the region of interest can be enhanced by lightening the aperture around a person within the region of interest. The video streams may then be displayed on a screen of the electronic device (e.g., to allow a user to view the image data) in a picture-in-picture (PIP) configuration.

This illustrative example is given to introduce the reader to the general subject matter discussed herein and the disclosure is not limited to this example. The following sections describe various additional non-limiting examples of home security gateway devices.

Examples are described herein in the context of home security devices, systems that include home security devices, methods that include home security devices, and computer-readable media programmed to perform similar methods. Those of ordinary skill in the art will realize that the following description is illustrative only and is not intended to be in any way limiting. For example, the features described with respect to the specific home security devices and specific methods herein are applicable to any other home security devices. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

FIG. 1 illustrates a home security system 100, according to certain embodiments. The home security system 100 includes a home security device 102, a network 114, one or more computing devices 130a-n, a home security gateway 140, and a server 150. The one or more computing devices 130a-n may include user devices such as mobile phones, personal computers, tablets, servers, cloud-based, systems, or any other suitable devices.

The home security gateway 140 may include a central panel, tablet, personal computer or other suitable device. The home security gateway 140 may be connected to multiple home security devices such as home security device 102 and other devices such as door monitors, window monitors, and other such devices. For example, the home security device 102 may be connected to the home security gateway 140 by a wired connection and/or a wireless connection such as Bluetooth, or other such wireless protocols. In some embodiments, the home security device 102 may communicate through the home security gateway 140 in order to reach the server 150 and/or the one or more computing devices 130a-n. In other embodiments, the home security device 102 may communicate directly with the server 150 and/or the computing devices 130a-n.

The server 150 may be any suitable computing device configured to receive data from a home security system such as the home security system 100. The server 150 may be configured to allow one or more of the home security device 102, the home security gateway 140, and the one or more computing device 130a-n to communicate with each other. The server 150 may also be configured to send and receive messages to emergency services such as police or fire. In some examples, the server 150 may include more than one servers, which may include virtual resources, non-virtual resources, and any suitable combination of virtual and non-virtual resources.

The network 114 may include a wired network or a wireless network, using protocols such as WiFi, Bluetooth, 433 MHz channels, or other suitable protocols. The network, 114 may be a local area network (LAN) or wide are network (WAN) such as the internet, a cellular or satellite network, or other suitable networks. Any or all of the home security device 102, the home security gateway 140, the server 150, and the one or more computing device 130a-n may be configured to access and communicate via the network 114.

The home security device 102 may include a camera 104, a processor unit 106, a memory 108, communications channels 125, a motion sensor 116, other sensors 118, and a microphone 124. The camera 104 may be configured to gather image and/or optical data in the visible light spectrum. In some embodiments, the camera 104 may be additionally configured to gather images in the infrared spectrum. The camera 104 may constantly be in an on-state or may only enter an on-state in response to some trigger. The trigger may originate from a sensor of the home security device 102 (e.g., the motion sensor 116 or the other sensors 118) or may be in response to some user input. The user input may be received from one of the computing devices 130a-n via the network 114, received by one or more of the communications channels 125.

Any of the sensors included in the home security device 102 may be operable to detect a change within the field of view. For example, the other sensors 118 may include thermal sensors, pressure sensors, a light sensor or any other suitable sensor, and be operable to register a thermal detection, a change in pressure, a change or interruption in light (such as a laser's path being broken) etc. Likewise, the motion sensor 116 may be operable to detect motion within a field of view. In an example, in response to the detected trigger, the motion sensor 116 and/or the other sensors 118 may send a signal to the processor unit 106 causing the home security device 102 to enter an on-state. Similarly, the microphone 124 may be configured to passively detect sounds. In response to detecting a sound, the motion sensor 116 and/or the microphone 124 may send a may send a signal to the processor unit 106 causing the camera 104 to enter an on-state. The camera 104 may then identify a suspected object of interest in the field of view. In response, the home security device 102 may then identify a region of interest. In some embodiments, the signal may cause the home security device 102 to identify a region of interest, as described in embodiments below.

The communication channels 125 may include one or more antennas and/or one or more network radios to enable communication between the home security device 102 and other electronic devices. In some examples, the communication channels 125 may enable the home security device 102 to pair with a primary device such as a smartphone. The pairing may be via WiFi, Bluetooth or Bluetooth Low Energy ("BLE"), near-field communication ("NFC"), or other suitable network protocol, and may enable some persistent data sharing. For example, data from the home security device 102 may be streamed and/or shared periodically with the smartphone, and the smartphone may process the data and/or share with the server 150. In some examples, the home security device 102 may be configured to communicate directly with the server via the network 114, e.g., the Internet, a cellular network, etc.

The memory 108 may include removable and/or non-removable elements, both of which are examples of non-transitory computer-readable memory. For example, non-transitory computer-readable storage media may include volatile or non-volatile, removable or non-removable media implemented in any method or technology for storage of information such as computer-readable instructions, data structures, model modules, or other data. The memory 108 is an example of non-transitory computer storage media. Additional types of computer storage media that may be present in the home security device 102 may include, but are not limited to, phase-change RAM (PRAM), static random-access memory (SRAM), dynamic random-access memory (DRAM), random-access memory (RAM), read-only memory (ROM), electrically erasable programmable read-only memory (EEPROM), flash memory or other memory technology, compact disc read-only memory (CD-ROM), digital video disc (DVD)) or other optical storage, magnetic cassettes, magnetic tape, magnetic disk storage or other magnetic storage devices, or any other medium that may be used to store the desired information and that may be accessed by the home security camera system. Combinations of any of the above should also be included within the scope of non-transitory computer-readable storage media. Alternatively, computer-readable communication media may include computer-readable instructions, model modules, or other data transmitted within a data signal, such as a carrier wave, or other transmission. However, as used herein, computer-readable storage media does not include computer-readable communication media.

The memory 108 may include computer-readable instructions. The instructions may be executed by the processor unit and cause the home security device 102 to perform a series of operations, as described in more detail in FIG. 6. The memory 108 may also include an artificial intelligence (AI) model. The AI model may be used to identify objects detected in the field of view and/or the region of interest by the camera 104, identify the region of interest, move the region of interest, and/or change the display size of the region of interest and/or the field of view. The AI model may be or include a machine learning model that may use an updatable reference library that be used, for example, to identify objects in the field of view. For example, the AI model may compare one or more Objects in the field of view to a reference library to identify what the object is. The reference library may be stored on the memory 108, or may be located on a non-local resource, accessed via the network 114.

In some examples, the AI model may be or include any suitable AI model. For example, the AI model may be trained to assign items a score. In this example, the AI model may receive image data including a suspected object of interest. The AI model may then compare that image data to images of objects of interest included in the updatable reference library. The AI model may assign one or more scores to the suspected object of interest, where each score represents a likelihood that the suspected object of interest matches a particular image in the updatable reference library. If one or more of the scores is above a predetermined threshold (e.g., a confidence interval), the AI model may return output that the suspected object of interest is likely to be an object of interest. One of ordinary skill in the art would recognize many different possibilities and configurations.

Although the home security device 102 is shown as one device, other configurations are possible. For example, the memory 108 may include memory on the home security device 102 as well as external memory on another device such as a home security gateway 140. Alternatively or in addition, the camera 104 may be separate from the home security device 102. In other words, any of the functions described below may be performed by a unitary device such as the home security device 102 or by a combination of any number of devices.

Figure 2:
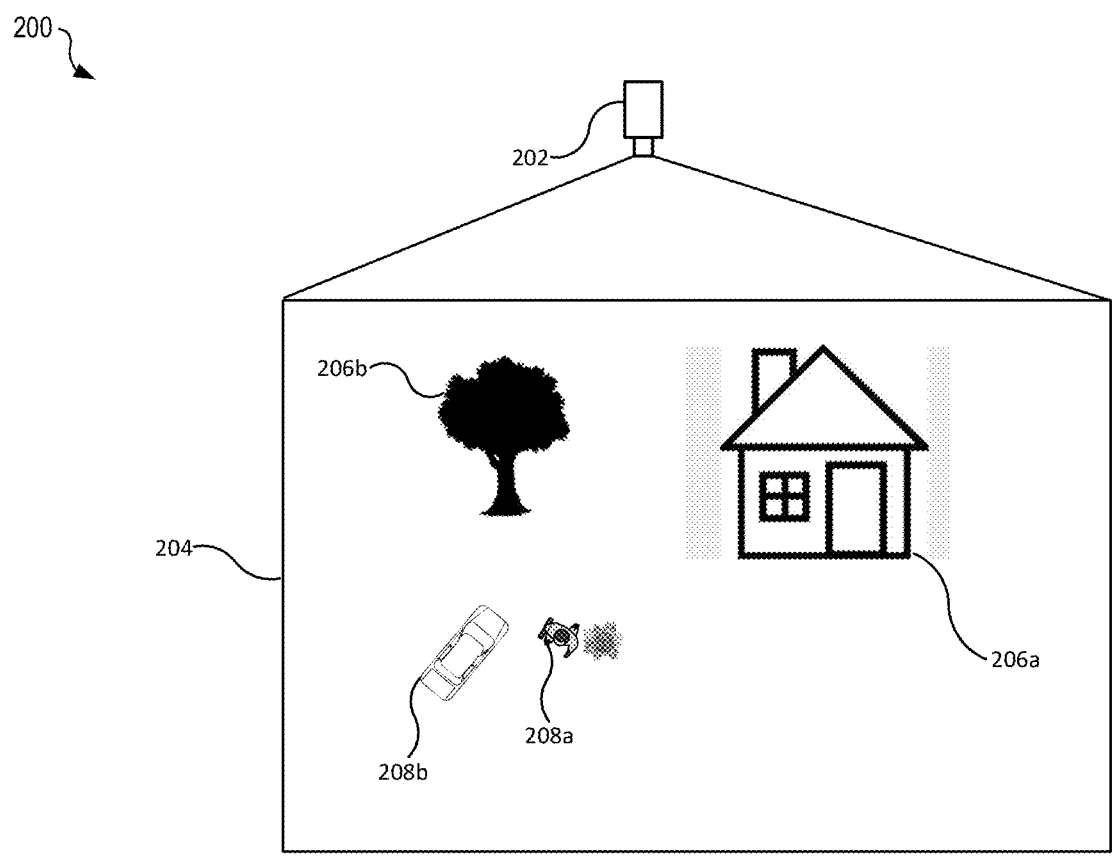
FIG. 2 illustrates a home security system with a home security device gathering image data from a field of view, according to certain embodiments.

FIG. 2 illustrates a home security system 200 with a home security device 202 gathering image data from a field of view 204, according to some embodiments. The home security device 202 may be similar to the home security device 102 in FIG. 1 and include all or some of the components and subsystems described therein. In some embodiments, the field of view 204 may be determined by a user setting of the home security device 202 set by the user. In other embodiments, the field of view 204 may be determined by one or more components of the home security device 202, such as a camera similar to the camera 104 in FIG. 1. The home security device 202 may be moved by a motor or other such apparatus, such that field of view 204 may be changed once set.

In this example, the field of view 204 may include one or more objects 206a-b. The object 206a may be a house as is shown here, and the object 206b may be a tree. The objects 206a-b may be part of a normal field of view, recognized by the home security device 202 as "normal." Thus, any AI model that may be loaded onto the home security device 202 may recognize the objects 206a-b as not an object of interest.

The field of view 204 may also include. The other objects 208a-b may not be recognized by the home security device 202. For example, the home security device 202 may first identify the one or more objects 206a-b and the other objects 208a-b within the field of view 204. Subsequently, the home security device 202 may determine that only the one or more objects 206a-b are "normal" and that the other objects 208a-bare suspected objects of interest (from here below, the other objects 208a-b may be referred to as the suspected objects of interest 208a-b).

The suspected objects of interest 208a-b may be a person, as is shown by the suspected object of interest 208a, a vehicle as is shown by the suspected object 208b, animals, unrecognized shapes, an unexpected change in one or more of the objects 206a-b, or unexpected movement. In an example where the object 206b is a tree, the object 206b may drop a branch unexpectedly. The home security device 202 may detect a change associated with the dropped branch, and the 206b may then become a suspected object of interest. In another example, the suspected object of interest 208a may move within the field of view 204. The home security device 202 may detect the movement and determine that the suspected object of interest 208a is a suspected object of interest.

Figure 3:
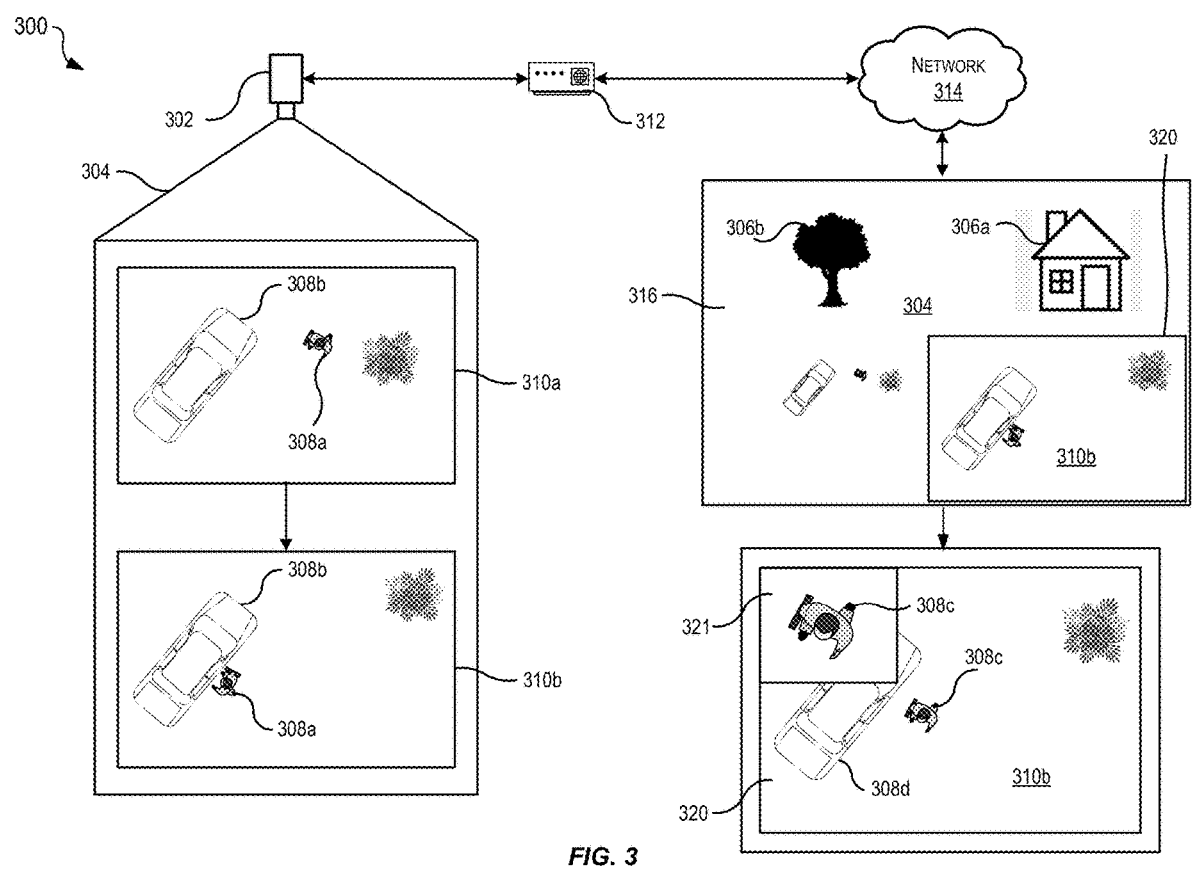
FIG. 3 illustrates a home security system identifying a region of interest, according to certain embodiments.

FIG. 3 illustrates a home security system 300 identifying a region of interest 310a, according to certain embodiments. The home security system 300 may include a home security device 302 and an intermediary device 312. The home security device 302 may be similar to the home security device 102 in FIG. 1, and therefore have similar components and capabilities. The home security device 302 may be operable to communicate to one or more user devices, such as the computing devices 130a-n in FIG. 1, using the intermediary device 312 via a network 314. The intermediary device 312 may include one or more of a modem, a cloud computing device, a server (e.g., server 150 in FIG. 1), a home security gateway device (e.g., the home security gateway 140 in FIG. 1), or other suitable devices. The network 314 may be the internee, a cellular network, a satellite network, or other suitable network. In some embodiments, the home security device 302 may communicate with the computing devices via the network 314 without using the intermediary device 312. The field of view 304 may be similar to the field of view 204 in FIG. 2. Thus, the field of view 304 may include objects 306a-b and other objects 308a-b.

The home security device 302 may detect a trigger in the field of view 304. Triggers may include receiving input from one or more sensors including a thermal sensor, a microphone, a motion sensor (e.g., the motion sensor 116 from FIG. 1), a camera (e.g., the camera 104 from FIG. 1), or other suitable sensors. Thus, the home security device 302 may receive a sound, a motion detection, and/or a thermal detection from one or more of the sensors. In response to the trigger, the home security camera device 302 may receive image data representing the field of view 304. The image data may include the objects 306a-b and the other objects 308a-b. After receiving the image data, the home security device 302 may classify the other objects 308a-b as suspected Objects of interest 308a-b and identify a region of interest 310a based on one or more of the suspected objects of interest 308a-b. (Other objects 308a-b may now be referred to as suspected objects of interest 308a-b). The region of interest 310a may be a portion of the field of view 304. In one embodiment, the home security device 302 may determine that the region of interest 310a should a fixed number of pixels around the suspected objects of interest 308a-b. Thus, the home security device 302 may center the region of interest 310a around one or more of the suspected objects of interest 308a-b and have an equal number of pixels about a perimeter of an image of the one or more suspected objects of interest 308a-b.

In other embodiments, the region of interest 310a may be of fixed dimensions. The home security device 302 may then determine a best possible resolution for the one or more suspected objects of interest 308a-b and identify the region of interest 310a based on the best possible resolution. For example, if in the case illustrated in FIG. 3, the suspected object of interest 308a is determined to be a person, the best possible resolution may include a level of detail such that a face of the person is distinguishable. The region of interest 310a may then include just an image of the face, enabling the image of the face to be entered into facial recognition software or similar products. If the suspected object of interest 308b is determined to be a vehicle, less resolution may be necessary e.g., just enough resolution to identify a make, model, and/or license plate or other identifying information). Thus, when compared to the suspected object of interest 308a (being a person), less resolution on the suspected object of interest 308b may be necessary and region of interest 310a may show a wider area of the field of view 304.

The home security device 302 may also detect that the suspected object of interest 308a has moved within the field of view 304 and/or within the region of interest 310a. The home security device 302 may then adjust the region of interest 310a into a new region of interest 310b. In other words, the region of interest 310b "follows" the suspected object of interest 308a, maintaining observation of the suspected object of interest 308a. In some embodiments, the region of interest 310b may be identified from the field of view 304 using the image data. In other embodiments, the home security device 302 may determine that the suspected object of interest 308a has moved beyond the field of view 304 and adjust a positioning of the home security device 302 to further observe the 308a.

In yet another embodiment, there may be more than one home security device 302. In this case, upon determining that the suspected object of interest 308a has moved beyond the field of view 304 associated with the home security device 302, the home security device 302 may determine another home security camera device is likely to have a corresponding field of view covering an expected position of the suspected object of interest 308a. The home security device 302 may then communicate with the other home security camera device to cause the other home security camera device to further observe the suspected object of interest 308a.

The home security device 302 may transmit the image data including the 310 and the suspected objects of interest 308a-b to an AI model. The AI model may be stored on a memory such as the memory 108 in FIG. 1. The AI model may alternatively be on a different device such as the intermediary device 312 or some separate device such as a server, cloud computing device, home security gateway device, or other such device. Based on output from the AI model, using the image data, the home security device 302 may determine that one or more of the suspected objects of interest 308a-b is an object of interest. For example, the home security device 302 may determine that suspected object of interest 308a is an object of interest, whereas the suspected object of interest 308b is not an object of interest. Alternatively, the home security device 302 may determine that both of the suspected objects of interest 308a-b are objects of interest.

After determining that one or more of the suspected objects of interest 308a-b are indeed objects of interest, the home security device 302 may provide video streams of the field of view 304 and the 310 to the computing devices. The home security device 302 may provide a first video stream 316 based on the image data. The first video stream 316 may include the entirety of the field of view 304. The home security device 302 may also provide a second video stream 320, also based on the image data and including the region of interest 310b. As is shown here, the region of interest 310b may be displayed on the computing device(s) as a picture-in-picture (PIP), overlayed on the first video stream 316 showing the field of view 304. In this manner, both the wider field of view 304 and the region of interest 310b may be shown simultaneously. A user may therefore be able to see detail of an object of interest such the object of interest 308a in the wider context provided by the field of view 304.

The home security device 302 may also adjust settings of one or more pixels included in the first or second video stream while providing the first and/or second video streams. The home security device 302 may perform modifications on the image data such that the suspected object of interest may be identified. For example, the home security device 302 may adjust the light, the aperture, the white balance, and/or the brightness of one or more pixels within the region of interest 310b. For example, the region of interest 310b can be enhanced by lightening the aperture around the mask of the suspected object of interest 308a to identify the suspected object of interest 308a as a person.

In response to a user command, the home security device 302 may also provide a focus video stream 321 that shows the object of interest 308c in greater detail. The focus video stream 321 may be overlayed as a on the second video stream 320 showing the region of interest 310b. The focus video stream 321 may replace the second video stream 320 and be a PIP of the first video stream 316, or the second video stream 320 may replace the first video stream 316 with the focus video stream 321 displayed as a PIP. Other configurations and possibilities would be apparent to one of ordinary skill in the art.

Figure 4:
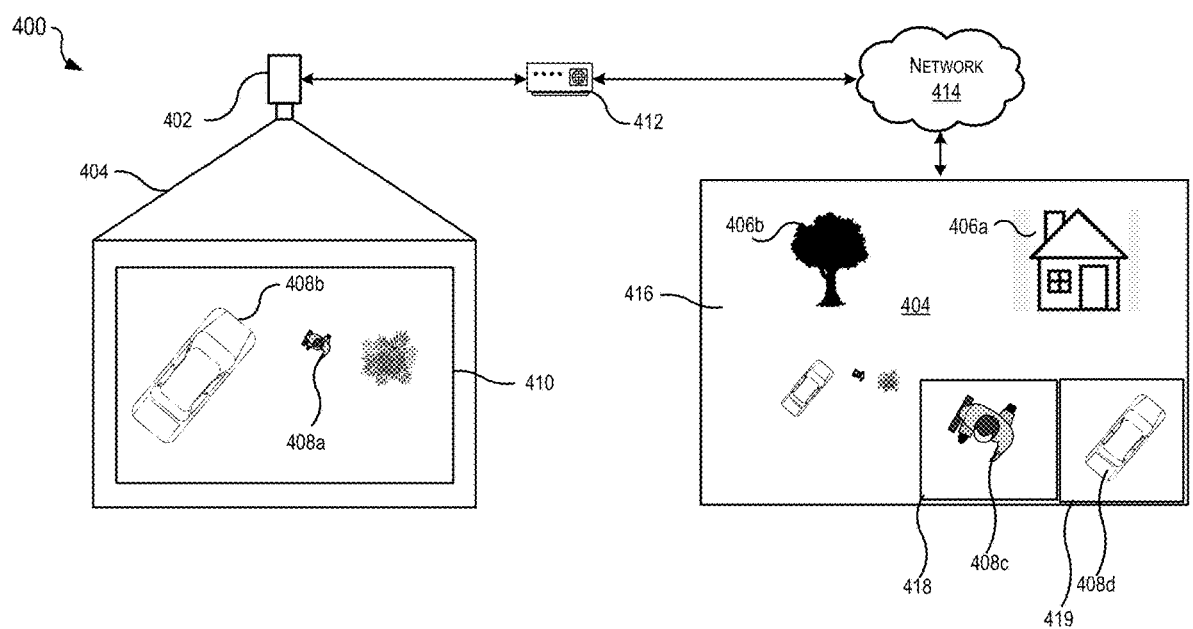
FIG. 4 illustrates a home security system including a first video stream, a second video stream, and a third video stream, of multiple objects of interest, according to certain embodiments.

FIG. 4 illustrates a home security system 400 including first video stream 416, second video stream 418, and third video stream 419 of multiple objects of interest 408c-d, according to certain embodiments. The home security system 400 may be similar to the home security system 300 in FIG. 3 and therefore include similar components and capabilities. Similarly, a home security device 402 may include similar components and capabilities to the home security device 302 in FIGS. 3 and 102 in FIG. 1. A region of interest 410 may also include objects 406a-b, similar in FIG. 3 other objects 408a-b, similar to the region of interest 310a, to objects 306a-b and other objects 308a-b.

In an embodiment, the home security device 402 may determine that both the other objects 408a-b are objects of interest 408c-d, respectively. The home security device 402 may then provide a first video stream 416 that includes a field of view 404 similar. The home security device 402 may then provide a second video stream 418 and a third video stream 419. The second video stream 418 may include a portion of the region of interest 410 that includes the object of interest 408c. The second video stream 418 may show the object of interest 408c in a best possible resolution. For example, the best possible resolution may include a level of detail such that a face of the object of interest 408c is distinguishable. The second video stream 418 may then include just an image of the face, enabling the image of the face to be entered into facial recognition software or similar products.

The third video stream 419 may include a portion of the third video stream 419 that includes the object of interest 408d. A best possible resolution of the images included in the third video stream 419 may be less than that of the second video stream 418. For example, best possible resolution may be just enough resolution to identify a make, model, and/or license plate or other identifying information. Thus, when compared to the object of interest 408c (being a person), less resolution on the object of interest 408b may be required.

Both the second video stream 418 and the third video stream 419 may be provided by the home security device 402 such that the second video stream 418 and the third video stream 419 are overlayed on the first video stream 416 as a PIP. In some embodiments, a user may specify that one of the PIP video streams should be more prominent. For example, a user may specify that the second video stream 418 should be more prominent. In that case, the first video stream 416 and the third video stream 419 may be provided such that the first video stream 416 and the third video stream 419 are displayed as PIP of the second video stream 418.

Figure 5:
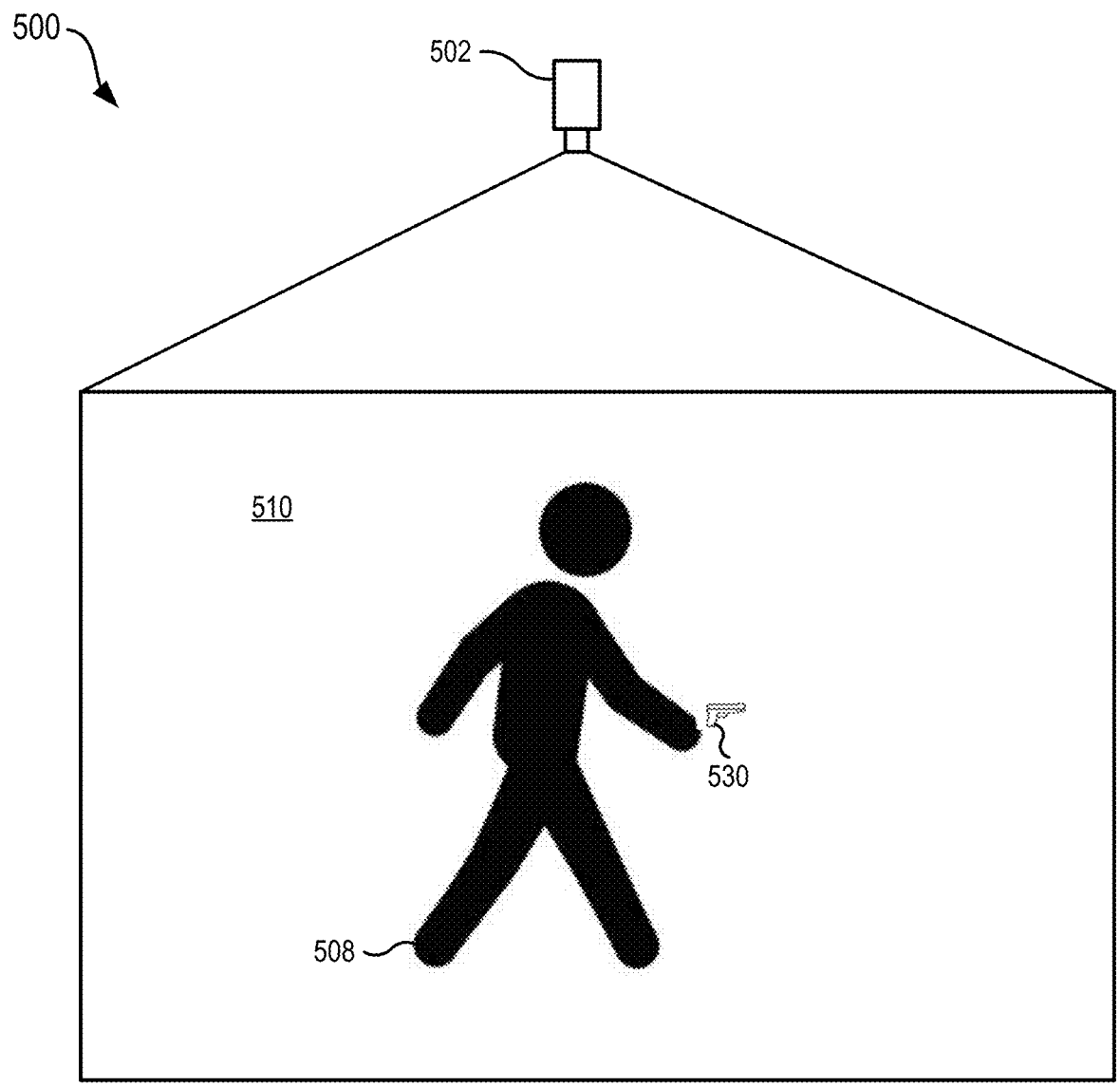
FIG. 5 illustrates a region of interest including an object of interest with a weapon, according to certain embodiments.

FIG. 5 illustrates a region of interest 510 including an object of interest 508 with a weapon 530, according to certain embodiments. The region of interest 510 may be similar to the region of interest region of interest 410 in FIG. 4. The region of interest 510 may be identified by a home security device 502 such as the home security device 402 in FIG. 4.

The home security device 502 may determine that the region of interest 510 includes the suspected weapon 530 based on at least a portion of image data corresponding to the region of interest 510. In some embodiments, the home security device 502 may identify the suspected weapon 530 before identifying the region of interest 510. In other embodiments, the home security device 502 may identify the suspected weapon 530 after identifying the region of interest 510 and/or enhancing images associated with the region of interest 510.

The home security device 502 may provide a portion of the image data including the region of interest 510 to an AI model. The AI model may provide an output based on the portion of the image data. For example, the AI model may compare the portion of the image data to a reference library containing images of weapons. The AI model may then assign a score to the image data, where the score represents a likelihood of the image data representing one or more weapons based on the images in the reference library. The home security device 502 may then determine that the suspected weapon 530 is a weapon, based on the output from the AI model. For example, if the output includes data that the suspected weapon has a score above a certain threshold to be a gun, (e.g., a confidence interval of 70%), the home security device 502 may determine that the suspected weapon 530 is a weapon.

In response to determining that the suspected weapon 530 is a weapon, the home security device 502 may generate an alert message. The alert message may include data that causes a computing device to display text, generate sounds or vibration, or other suitable alarms. The home security device 502 may then transmit the alert message to the computing device. In addition, the home security device 502 may provide an enhanced view of the suspected weapon. For example, the home security device 502 may provide a separate video stream representing an area about the suspected weapon 530 such as the second video stream 320 or the focus video stream 321 in FIG. 3. The home security device 502 may also adjust the light, the aperture, the white balance, and/or the brightness of one or more pixels within the region of interest shown in the separate video stream.

Additionally, any of the process described in relation to FIGS. 2-4 may be applied to those described in relation to FIG. 5.

Figure 6:
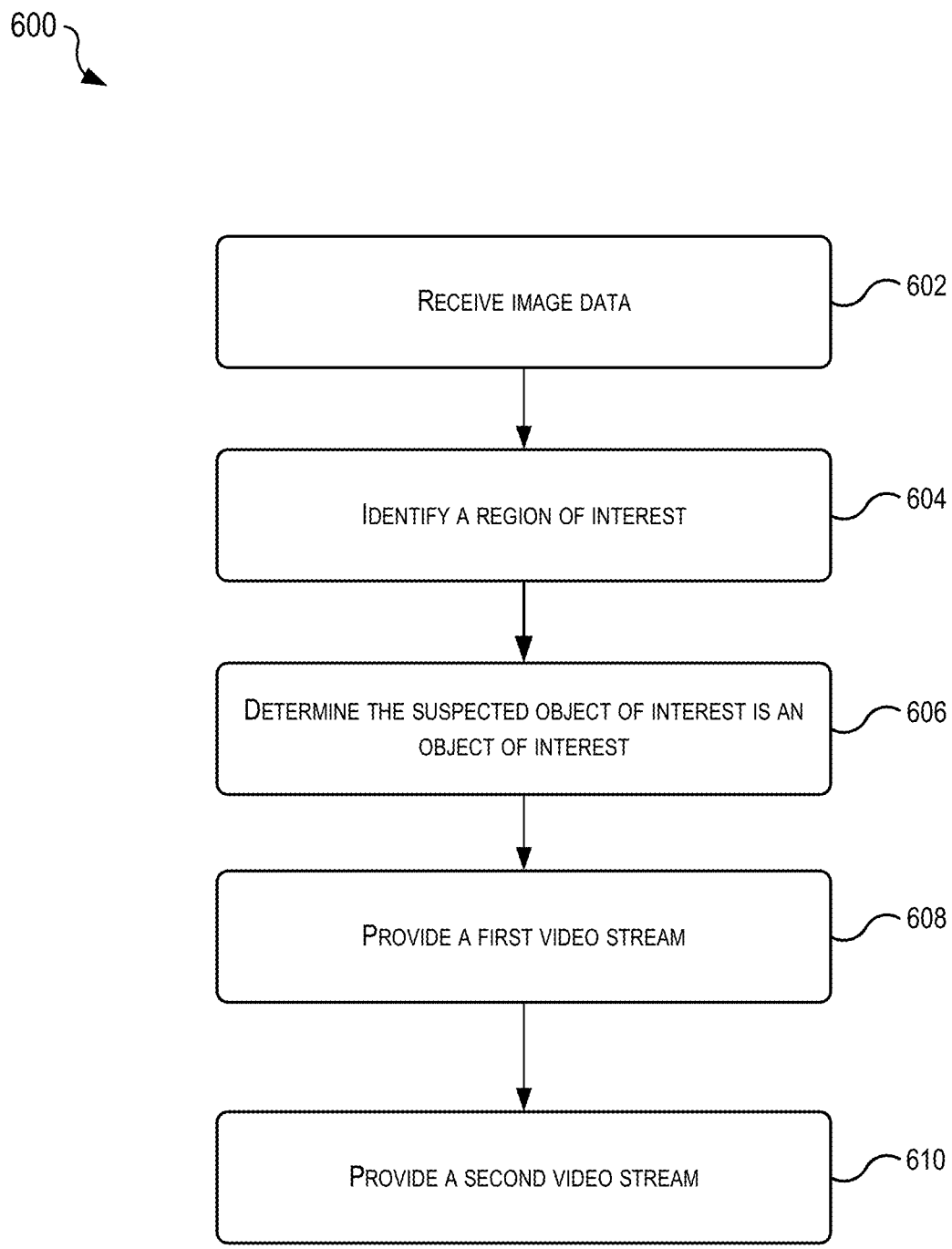
FIG. 6 illustrates a flowchart illustrating a process of a computer-implemented method for providing a representation of a region of interest, according to certain embodiments.
Figure 7:
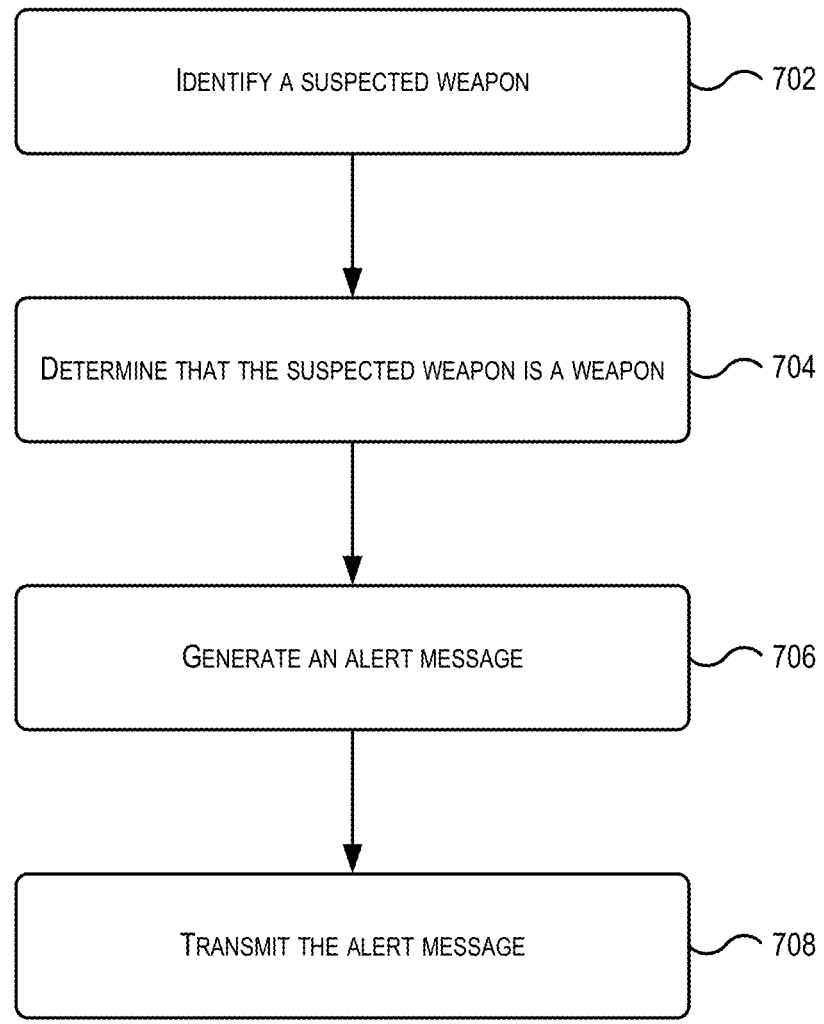
FIG. 7 illustrates a flowchart illustrating a process of a computer-implemented method for identifying a weapon, according to certain embodiments.

FIGS. 6 and 7 illustrate example flow diagrams showing respective processes 600 and 700, as described herein. The processes 600 and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 6 illustrates a flowchart illustrating a process 600 of a computer-implemented method for providing a representation of a region of interest, according to some embodiments. The process 600 may be performed by any of the systems described above. For example, some or all of the process may be performed by the home security device 102 in FIG. 1. Additionally or alternatively, some or all of the functions may be performed by other devices such as the server 150 and/or the home security gateway 140. At block 602, the process 600 may include a device receiving image data in response to a trigger. The trigger may include movement of one or more of the suspected Objects of interest within the field of view. The movement may be detected by a motion detector such as the motion sensor 116 to cause the home security device 302 to enter an on-state. In other examples, the movement may be picked up by a camera such as the camera 104. In yet another example, the trigger may be a thermal detection from a thermal sensor or from a thermal imaging capability of the camera. In still yet another example, the trigger may be a sound picked up by a microphone such as the microphone 124 in FIG. 1.

The image data may represent a field of view that includes a suspected object of interest. The field of view may be determined by a setting of a home security camera device similar to the camera 104 in FIG. 1. In some embodiments, the field of view may be determined by one or more components of the home security camera device such as an aperture or lens. The home security camera device may be mounted on a moveable mount, allowing the field of view may to be altered by moving the home security camera device.

The suspected object of interest may be a person, a vehicle, an animal, unrecognized shapes, of an unexpected change in one or more of known objects. For example, a person may enter into the field of view. The movement may be detected by the device, and the source of the movement identified as a suspected object of interest. In another example, the person may be recognized as an object not recognized by the device. The device may then classify the person as a suspected object of interest.

At block 604, the process 600 may include the device identifying a region of interest based on the suspected object of interest. The region of interest may be a portion of the field of view. In one embodiment, the device may determine the region of interest as a fixed number of pixels around the suspected object of interest. Thus, the device may center the region of interest around the suspected object of interest to have an equal number of pixels about a perimeter of an image of the suspected object of interest.

In other embodiments, the region of interest may be of fixed dimensions. The device may then determine a best possible resolution for the one or more suspected object of interest and identify the region of interest based on the best possible resolution. For example, if in the case illustrated in FIG. 3, the suspected object of interest is determined to be a person, the best possible resolution may include a level of detail such that a face of the person is distinguishable. The region of interest may then include just an image of the face, enabling the image of the face to be entered into facial recognition software or similar products. If the suspected object of interest is determined to be a vehicle, less resolution may be necessary (e.g., just enough resolution to identify a make, model, and/or license plate or other identifying information).

At block 606, the process 600 may include the device determining that the suspected object of interest is an object of interest. The device may provide a portion of the image data including the region of interest to an artificial intelligence model. The device may then determine that the suspected object of interest is an object of interest based on output from the AI model. The AI model may be stored on a memory of the device such as the memory 108 in FIG. 1. The AI model may alternatively be on a third-party device such as a server, cloud computing device, home security gateway device, or other such device. In some embodiments, there may be multiple suspected objects of interest. In that case, the device may determine that a first suspected object of interest is an object of interest, whereas a second suspected object of interest is not an object of interest. Alternatively, the device may determine that both of the suspected objects of interest are objects of interest.

At block 608, the process 600 may include the device providing a first video stream for presentation at a computing device. The device may provide the first video stream to an intermediary device (as described in FIG. 3) such as a server, cloud computing device, home security gateway device, or other suitable device. Alternatively or in addition, the device may provide the first video stream to a user device such as a mobile phone, tablet, personal computer or other such device. The first video stream may represent the field of view in its entirety.

At block 610, the process 600 may include the device providing a second video stream for presentation at the computing device, substantially simultaneously with the first video stream. The device may provide the second video stream to a server, cloud computing device, home security gateway device, or other suitable device. Alternatively or in addition, the device may provide the second video stream to a user device such as a mobile phone, tablet, personal computer or other such device. The second video stream may represent the region of interest. Providing the second video stream substantially simultaneously with the first video stream may include providing the second video stream as a VIP of the first video stream.

In some embodiments, the process 600 may include receiving image data including a second suspected object of interest. The device may then identify a second region of interest within a portion of the field of view. The second region of interest may include the second suspected object of interest. The device may then determine that the second suspected object of interest is a second object of interest, based on output from the AI model. The device may provide a portion of the image data including the second region of interest to an AI model and receive output from the AI model based on the portion of the image data corresponding to the second region of interest.

The device may then provide a first video stream representing the field of view for presentation at a computing device. The device may provide the first video stream to a server, cloud computing device, home security gateway device, or other suitable device. Alternatively, or in addition, the device may provide the first video stream to a user device such as a mobile phone, tablet, personal computer or other such device. The first video stream may represent the field of view in its entirety. The device may then provide a third video stream, substantially simultaneously with the first video stream, for presentation at the computing device. Providing the third video stream substantially simultaneously with the first video stream may include providing the third video stream as a PIP of the first video stream.

In some embodiments, the second video stream and the third video stream may both be provided substantially simultaneously with the first video stream. Both the second and third video streams may then be presented as a PIP of the first video stream (as is shown in FIG. 4).

In some embodiments, the device may receive a focus signal from a user device. The focus signal may include data associated with a portion of the field of view. Based on the focus signal, the device may identify a third region of interest within the field of view. The device may the provide a fourth video stream, substantially simultaneously with the first video stream, for presentation at the computing device. The fourth video stream may be presented as a PIP of the first video stream. In some embodiments, the focus signal may cause the second video stream to be replaced by the fourth video stream. In other embodiments, the fourth video stream may be presented in addition to the second video stream.

In some embodiments, identifying the region of interest may also include determining that the image data contains light-distorted images. For example, a suspected object of interest may be backlit by the sun or other light source. The suspected object of image would therefore be silhouetted against a background. The device may then identify a mask of the suspected object of interest. The mask may include an outline of the suspected object of interest. The device may then perform modifications on the image data such that the suspected object of interest may be identified. For example, the device may adjust the light, the aperture, the white balance, and/or the brightness of one or more pixels within the region of interest. For example, the region of interest can be enhanced by lightening the aperture around the mask of the suspected object of interest to identify a person within the region of interest.

FIG. 7 illustrates a flowchart illustrating a process 700 of a computer-implemented method for identifying a weapon, according to certain embodiments. The process 700 may be performed by any of the systems described above. For example, some or all of the process 700 may be performed by the home security device 102 in FIG. 1. Additionally or alternatively, some or all of the functions may be performed by other devices such as the server 150 and/or the home security gateway 140. At block 702, the process 700 may include a device identifying a suspected weapon based in part on image data. The image data may correspond to a region of interest such as the region of interest 510 in FIG. 5. In some embodiments, the device may identify the suspected weapon before identifying the region of interest. In other embodiments, the device may identify the suspected weapon after identifying the region of interest and/or enhancing images associated with the region of interest.

At block 704, the process 700 may include the device determining that the suspected weapon is a weapon. The device may provide a portion of the image data including the region of interest to an AI model. The AI model may provide an output based on the portion of the image data. The device may then determine that the suspected weapon is a weapon, based on the output from the AI model.

At block 706, the process 700 may include the device generating an alert message. The alert message may include data that causes a computing device to display text, generate sounds or vibration, or other suitable alarms. At block 708, the process 700 may include the device transmitting the alert message to a computing device. The computing device may include a handheld user device such as a mobile phone, tablet, home security gateway, or other suitable device. The computing device also include an intermediary device such as the intermediary device 312 in FIG. 3 and including a server, home security gateway device, cloud computing device, or other suitable device.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A home security device, comprising:
   one or more sensors;
   a camera configured to capture image data;
   one or more processors; and
   a non-transitory computer-readable memory comprising instructions that when executed by the one or more processors, cause the home security device to perform operations comprising:
      detecting, by the at least one of the camera and the one or more sensors, a trigger;
      receiving, by the camera and in response to the trigger, image data representing a field of view and comprising a suspected object of interest;
      identifying, based at least in part on the suspected object of interest, a region of interest within a portion of the field of view, the region of interest comprising the suspected object of interest;
      determining that the suspected object of interest is an object of interest based at least in part on output from an artificial intelligence model, wherein the output is generated by the artificial intelligence model using a portion of the image data corresponding to the region of interest;
      providing, for presentation at a computing device, a first video stream generated by the camera and representing the field of view;
      modifying a light setting of a pixel within a second video stream generated by the camera to be within a threshold, such that the second video stream represents the suspected object of interest;
      providing, for presentation at the computing device together with the first video stream, the second video stream representing the region of interest;
      determining that the image data comprises light-distorted images;
      identifying a mask of a suspected object of interest, the mask comprising the light-distorted images; and
      performing modifications on the image data, based at least in part on the mask of the suspected object of interest, such that the suspected object is represented in the image data.

2. The home security device of claim 1, wherein the artificial intelligence model comprises a machine learning model.

3. The home security device of claim 1, wherein the trigger further causes the home security device to enter an on-state.

4. The home security device of claim 1, wherein the one or more sensors comprise one or more of a thermal sensor, a microphone, and a motion sensor.

5. The home security device of claim 1, wherein the trigger comprises one or more of a sound, a movement, and a thermal detection.

6. The home security device of claim 1, wherein the operations further comprise transmitting the first video stream and the second video stream to a server.

7. The home security device of claim 1, wherein the operations further comprise transmitting the first video stream and the second video stream to a user device.

8. A computer-implemented method, comprising:
   receiving, in response to a trigger, image data representing a field of view that includes a suspected object of interest;
   identifying, based at least in part on the suspected object of interest, a region of interest within a portion of the field of view, the region of interest comprising the suspected object of interest;
   determining that the suspected object of interest is an object of interest based at least in part on output from an artificial intelligence model, wherein the output is generated by the artificial intelligence model using a portion of the image data corresponding to the region of interest;
   providing, for presentation at a computing device, a first video stream generated by a camera and representing the field of view;
   modifying a light setting of a pixel within a second video stream generated by the camera to be within a threshold, such that the second video stream represents the suspected object of interest;
   providing, for presentation at the computing device together with the first video stream, the second video stream representing the region of interest;
   determining that the image data comprises light-distorted images;
   identifying a mask of a suspected object of interest, the mask comprising the light-distorted images; and
   performing modifications on the image data, based at least in part on the mask of the suspected object of interest, such that the suspected object is represented in the image data.

9. The computer-implemented method of claim 8, wherein providing the second video stream together with the first video comprises providing the second video stream as a picture-in-picture of the first video stream.

10. The computer-implemented method of claim 8, further comprising:
    identifying, based at least in part using a portion of the image data, a suspected weapon within the region of interest;
    determining that the suspected weapon is a weapon based at least in part on the output generated by the artificial intelligence model using a portion of the image data corresponding to the region of interest;
    generating, in response to determining that the suspected weapon is a weapon, an alert message; and
    transmitting the alert message to the computing device.

11. The computer-implemented method of claim 8, further comprising:
    receiving the image data representing the field of view that includes a second suspected object of interest;
    identifying, based at least in part on the second suspected object of interest, a second region of interest within a portion of the field of view, the second region of interest comprising the second suspected object of interest;

determining that the second suspected object of interest is a second object of interest based at least in part on output from the artificial intelligence model, wherein the output is generated by the artificial intelligence model using the portion of the image data corresponding to the second region of interest;

providing, for presentation at the computing device, the first video stream representing the field of view; and providing, for presentation at the computing device together with the first video, a third video stream representing the second region of interest.

12. The computer-implemented method of claim 11, wherein providing the second video stream and the third video stream together with the first video stream comprises providing the second video stream and the third video stream as a picture-in-picture of the first video stream.

13. The computer-implemented method of claim 8, wherein the computing device comprises a user device or home security gateway device, and wherein the computer-implemented method further comprises:

receiving, from the computing device, a focus signal comprising data associated with a portion of the field of view;

identifying, based on the focus signal, a third region of interest within the field of view; and providing for presentation at the computing device together with the first video, a fourth video stream representing the third region of interest.

14. The computer-implemented method of claim 13, wherein the focus signal comprises a command that causes the presentation of the second video stream to be replaced by the fourth video stream.

15. A non-transitory computer-readable memory comprising instructions that, when executed, causes a computer to perform operations comprising:

detecting a triggering event utilizing one or more sensors;

receiving, in response to a trigger, image data representing a field of view that includes a suspected object of interest;

identifying, based at least in part on the suspected object of interest, a region of interest within a portion of the field of view, the region of interest comprising the suspected object of interest;

determining that the suspected object of interest is an object of interest based at least in part on output from an artificial intelligence model, wherein the output is generated by the artificial intelligence model using a portion of the image data corresponding to the region of interest;

providing, for presentation at a computing device, a first video stream generated by a camera and representing the field of view;

modifying a light setting of a pixel within a second video stream generated by the camera to be within a threshold, such that the second video stream represents the suspected object of interest;

providing, for presentation at the computing device together with the first video, the second video stream representing the region of interest;

determining that the image data comprises light-distorted images;

identifying a mask of a suspected object of interest, the mask comprising the light-distorted images; and performing modifications on the image data, based at least in part on the mask of the suspected object of interest, such that the suspected object is represented in the image data.

16. The non-transitory computer-readable memory of claim 15, wherein the object of interest is at least one of a vehicle and a person.

17. The non-transitory computer-readable memory of claim 15, wherein the trigger comprises detected motion.

18. The non-transitory computer-readable memory of claim 16, wherein the detected motion is determined from the image data.

* * * * *